L. H. CHURCH.
GAS CONNECTION FOR OUTLET BOXES.
APPLICATION FILED MAR. 11, 1910.
979,652.
Patented Dec. 27, 1910.
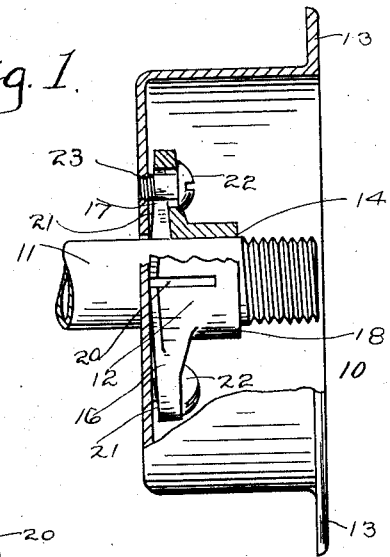
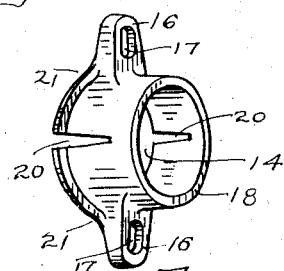
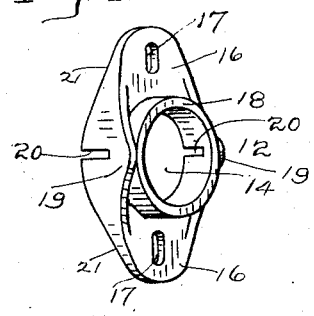
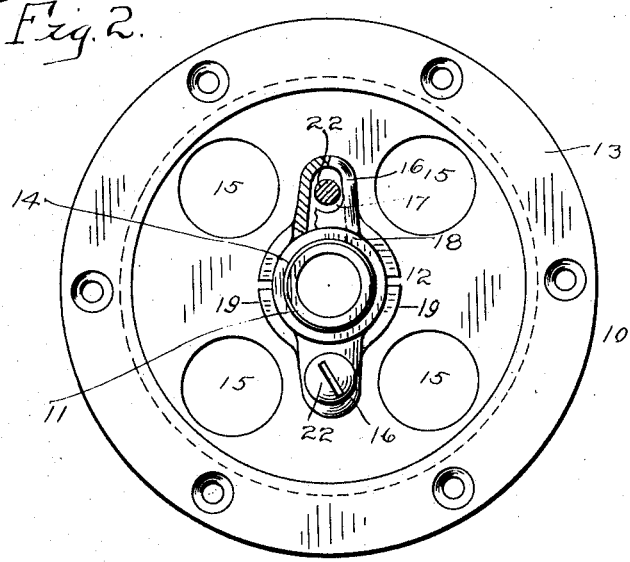
WITNESSES:
E. P. Wold
S. W. Atherton
INVENTOR
Lewis H. Church
BY
N. Wooster
ATTORNEY

UNITED STATES PATENT OFFICE.

LEWIS H. CHURCH, OF STAMFORD, CONNECTICUT, ASSIGNOR TO THE STANDARD ELECTRIC FITTINGS COMPANY, OF STAMFORD, CONNECTICUT, A CORPORATION OF CONNECTICUT.

GAS CONNECTION FOR OUTLET-BOXES.

979,652.

Specification of Letters Patent. Patented Dec. 27, 1910.

Application filed March 11, 1910. Serial No. 548,548.

*To all whom it may concern:*

Be it known that I, LEWIS H. CHURCH, a citizen of the United States, residing at Stamford, county of Fairfield, State of Connecticut, have invented an Improvement in Gas Connections for Outlet-Boxes, of which the following is a specification.

This invention has for its object to provide a simple and inexpensive clamp or connection for securing gas pipes and armored cables to outlet boxes, which will grip a gas pipe or cable firmly, may be easily attached and detached and which may be blanked out and formed to shape from sheet metal.

With these and other objects in view I have devised the simple and novel connection which I will now describe, referring to the accompanying drawing forming a part of this specification and using reference characters to indicate the several parts:

Figure 1 is a side elevation partly in section, showing the construction of my novel connection and its mode of operation when applied to an outlet box; Fig. 2 a front elevation of an outlet box with my novel connection in place; and Figs. 3 and 4 are perspectives of variant forms of the connection detached.

I have illustrated my novel connection as applied to an ordinary form of outlet box and as used to secure a gas pipe thereto, although it should be understood that it is equally adapted for use in attaching an armored cable to an outlet box. When used for attaching gas pipes to outlet boxes, this type of connection is frequently described in the trade as a grounding clamp.

10 denotes an outlet box which may be of any ordinary or preferred construction and may be cast or made of sheet metal as preferred, 11 a gas pipe and 12 my novel connection. The outlet box is shown as provided with the usual attaching flange 13, with a central hole 14 to receive a gas pipe and with holes 15 to receive electrical conductors.

My novel connection may be cast but is preferably blanked out and formed to shape from sheet metal. It comprises attaching arms 16 having slots 17 for the passage of screws, a central hub 18 through which the gas pipe or cable passes and side flanges 19 which may or may not be made relatively wide and turned up against the sides of the hub, as shown in Fig. 4.

The essential features of construction of the connection are that the hub and the side flanges are provided with slots 20 and that the face of the connection is highest at the center transversely and is provided with inclines rising from the center and extending toward the ends. That is to say, the face of the connection engages the bottom of the outlet box centrally and is inclined away from the flat plane of the bottom of the outlet box toward both ends, the inclines being indicated by 21.

The operation will be readily understood from Fig. 1. The gas pipe or armored cable, as may be, is passed through hole 14 in the bottom of the outlet box, the connection is passed over the end of the pipe or cable within the box and screws 22 passing through the slots 17 in the attaching arms are turned into engagement with holes 23 in the bottom of the outlet box. As the screws are turned down they carry the attaching arms of the connection inward toward the bottom of the outlet box and owing to the spring action of the hub, which results from the slots 20 in the hub and the side pieces, the walls of the hub at its inner end are forced inward and are caused to grip the pipe or cable firmly, thereby locking it securely to the outlet box, and in case the connection is used upon a gas pipe, and electric cables are passed through the holes 15 in the outlet box, making an effective ground connection. As soon as the screws are loosened the grip upon the gas pipe or cable will be relieved and it may be removed without detaching the connection from the outlet box.

Having thus described my invention I claim:

1. A connection of the character described comprising attaching arms having faces highest at the center transversely and inclining from the center toward the ends, a central hub and slots in the sides of the hub which cause the wall of the hub to close inward, for the purpose set forth, when the attaching arms are pressed downward.

2. A connection of the character described comprising attaching arms having faces highest at the center transversely and inclining from the center toward the ends, a central hub and side flanges, said hub and flanges being provided with slots whereby the walls of the hub are caused to close inward when the attaching arms are pressed downward.

3. A connection of the character described having a face highest at the center and inclining from the center toward the ends and having slots for attaching screws and a central hub and side flanges provided with slots which permit the walls of the hub to move inward, for the purpose set forth, when the connection is attached in place.

4. A sheet metal connection of the character described having a face highest at the center and inclining toward the ends, and a central hub provided with slots, for the purpose set forth.

5. A connection of the character described comprising attaching arms having faces highest at the center transversely and inclining from the center toward the ends, and a central hub having slots, for the purpose set forth.

In testimony whereof I affix my signature in presence of two witnesses.

LEWIS H. CHURCH.

Witnesses:
   MARY C. COCHRANE,
   MURIEL WELLS.